(12) United States Patent
Collingrige

(10) Patent No.: US 8,687,547 B2
(45) Date of Patent: Apr. 1, 2014

(54) METHOD AND SYSTEM FOR AUTOMATIC CONNECTION TO A NETWORK

(75) Inventor: Robert Collingrige, Ipswich (GB)

(73) Assignee: British Telecommunications public limited company, London (GB)

(*) Notice: Subject to any disclaimer, the term of this patent is extended or adjusted under 35 U.S.C. 154(b) by 570 days.

(21) Appl. No.: 12/863,767

(22) PCT Filed: Jan. 15, 2009

(86) PCT No.: PCT/GB2009/000121
§ 371 (c)(1),
(2), (4) Date: Jul. 20, 2010

(87) PCT Pub. No.: WO2009/098432
PCT Pub. Date: Aug. 13, 2009

(65) Prior Publication Data
US 2010/0290424 A1 Nov. 18, 2010

(30) Foreign Application Priority Data

Feb. 4, 2008 (GB) .................................... 0802003.4
Mar. 25, 2008 (GB) .................................... 0805399.3

(51) Int. Cl.
*H04W 4/00* (2009.01)

(52) U.S. Cl.
USPC .......................................... 370/328; 370/338

(58) Field of Classification Search
USPC .................................. 370/328, 329, 338, 334
See application file for complete search history.

(56) References Cited

U.S. PATENT DOCUMENTS

| | | | |
|---|---|---|---|
| 2003/0100308 | A1 | 5/2003 | Rusch |
| 2004/0063426 | A1 | 4/2004 | Hunkeler |
| 2004/0066759 | A1 | 4/2004 | Molteni et al. |

(Continued)

FOREIGN PATENT DOCUMENTS

| | | |
|---|---|---|
| GB | 2389497 | 12/2003 |
| WO | 2004/008793 | 1/2004 |
| WO | 2004/077753 | 9/2004 |
| WO | 2007/104038 | 9/2007 |

OTHER PUBLICATIONS

Zuendt, M. et al., "Seamless Handoff in Community Based and Location Aware Heterogeneous Wireless Networks", International Workshop on Mobile Multimedia Conference, (Oct. 5, 2003), pp. 1-5.

(Continued)

*Primary Examiner* — Andrew Lee
(74) *Attorney, Agent, or Firm* — Nixon & Vanderhye P.C.

(57) ABSTRACT

A processing terminal, for example a PDA or laptop, includes one or more application-layer programs and a network broker. The network broker exposes currently-available network resources, such as network access points in-range of the terminal, to the applications layer. The network broker is also arranged to automatically establish network connections via the or each network access point and to acquire operating parameters indicative of the status and/or performance of the connections. The available bandwidth of a connection is one example of an operating parameter. Data subsequently sent to, or transmitted from, the application-layer programs is communicated over a selected one or more of the established connections in accordance with predefined connection rules indicating which connection is/are to be selected in dependence on the operating parameters. Access credentials for enabling the terminal automatically to access a network via a different access point can also be provided using an existing connection.

20 Claims, 7 Drawing Sheets

(56) References Cited

U.S. PATENT DOCUMENTS

| | | |
|---|---|---|
| 2004/0203732 A1 | 10/2004 | Brusilovsky et al. |
| 2004/0246920 A1 | 12/2004 | Savolainen |
| 2004/0266433 A1 | 12/2004 | Maillard et al. |
| 2005/0059397 A1 | 3/2005 | Zhao |
| 2005/0177874 A1 | 8/2005 | Suzuki et al. |
| 2005/0185653 A1 | 8/2005 | Ono et al. |
| 2005/0197156 A1 | 9/2005 | Fourquin et al. |
| 2005/0239443 A1 | 10/2005 | Watanabe et al. |
| 2005/0250552 A1* | 11/2005 | Eagle et al. ................ 455/567 |
| 2006/0209773 A1* | 9/2006 | Hundal et al. ............... 370/338 |
| 2007/0010278 A1* | 1/2007 | D'Agostino et al. ......... 455/522 |
| 2007/0032240 A1* | 2/2007 | Finnegan et al. ............. 455/445 |
| 2007/0259687 A1* | 11/2007 | Huang et al. .............. 455/552.1 |
| 2007/0291683 A1* | 12/2007 | Bonner et al. ............... 370/328 |
| 2008/0056286 A1 | 3/2008 | Forssell et al. |
| 2008/0057912 A1 | 3/2008 | Deprun |
| 2009/0088219 A1* | 4/2009 | Bayne ........................ 455/566 |
| 2011/0264735 A1* | 10/2011 | Gaver et al. .................. 709/204 |
| 2011/0310875 A1* | 12/2011 | Tysowski et al. ............. 370/338 |

OTHER PUBLICATIONS

International Search Report dated Jun. 25, 2009 issued in International Application No. PCT/GB2009/000121.

Search Report dated Jul. 22, 2008 issued in United Kingdom Application No. GB0805399.3.

Search Report dated Nov. 6, 2006 issued in United Kingdom Application No. GB0614546.0.

Office Action (9 pgs.) dated Oct. 11, 2012 issued in corresponding European Patent Application No. 09 708 177.2.

* cited by examiner

| | Home Network? | Bandwidth > 2Mbits/sec | Cost ≤ £1/Hour? | Delay/Latency = Low | Rank |
|---|---|---|---|---|---|
| Bluetooth | N/A | N/A | N/A | N/A | N/A |
| OurZone Wi-Fi (P) | • | • | • | | 1 |
| OurZone Wimax | • | • | | • | 2 |
| TheirZone Wi-Fi | | • | | | 4 | b

GLOBAL SELECTION RULES
ALWAYS SELECT INTERFACE PROVIDING:

☐ Home Network Link
☑ Highest Available Bandwidth
☐ Lowest Cost
☐ Lowest Delay/Latency
☐ Highest Quality of Service

[Apply] [Cancel]

a

VoIP Application ▼  SELECTION RULES
ALWAYS SELECT INTERFACE PROVIDING:

☐ Home Network Link
☐ Highest Available Bandwidth
☐ Lowest Cost
☑ Lowest Delay/Latency
☐ Highest Quality of Service

[Apply] [Cancel]

c

VoIP Application ▼  SELECTION RULES

☐ Home Network Link
☑ Highest Available Bandwidth  [>2Mbits/sec]
☑ Lowest Cost  [<£1/Hr]
☐ Lowest Delay/Latency  [Low]
☐ Highest Quality of Service

[Apply] [Cancel]

METHOD AND SYSTEM FOR AUTOMATIC CONNECTION TO A NETWORK

This application is the U.S. national phase of International Application No. PCT/GB2009/000121 filed 15 Jan. 2009, which designated the U.S. and claims priority to GB Application No. 0802003.4 filed 4 Feb. 2008; and GB Application No. 0805399.3 filed 25 Mar. 2008, the entire contents of each of which are hereby incorporated by reference.

BACKGROUND AND SUMMARY

The invention relates to data communications, and particularly to a method of operating a communications terminal, a method of providing access information to a communications terminal and apparatus for performing the methods.

In order for communications terminals to communicate with a network, it is usual to first establish a connection between a network interface of the terminal and a network access point. In the case of the Internet, for example, a modem is used by the terminal to establish a connection with the server of an Internet Service Provider (ISP) via a telephone line, the resulting connection being an access channel through which data communications take place. Wireless access points, e.g. Wi-Fi or WiMax access points, are further examples of access points by means of which a terminal having a suitable network interface can connect to a network.

The provision of publicly-accessible access points has increased significantly over recent years and this trend is set to continue. As a result, it is common for users to have the ability to communicate with a network by means of several different access points. This is particularly the case for users of portable devices, such as laptop PCs and personal digital assistants (PDAs), since the user's geographical location can change as they travel from place to place which means that the number, type and provider of network access points will also change. In such situations, connection to a particular access point usually involves manual selection of one of the access points available at the user's current location, which is thereafter used for data transfer for the entire session. Selection is often based on the user identifying an 'open' access point or an access point for which they have previously obtained a password through subscription to a service provider. The manual selection process carried out by the user may pay little regard to the performance or cost associated with data transfer using a particular access point, through lack of familiarity with what is currently available, and its capabilities. The performance or cost may even change during the course of a session, as a result of movement through the area of coverage, or because of changes in the nature of the transactions being carried out during the course of the session. This means that data transfer is often effected via an access point which does not provide the most efficient or suitable means of data transfer to or from the network.

According to a first aspect of the invention, there is provided a method of operating a communications terminal which comprises a plurality of network interfaces each capable of establishing an access channel with a respective network by a process of connecting to one or more remote network node(s), the method comprising:

(a) establishing a first access channel between a first network interface of the communications terminal and a first remote network node;

(b) receiving over the first access channel, from a predetermined network address, profile information identifying one or more further network node(s), the profile information including access data to allow establishment of a further access channel between a network interface of the communications terminal and the or each further network node(s);

(c) detecting the presence of a second network node connected to, or in range of, the communications terminal; and (d) in response to said detection, identifying whether the profile information received in step (b) corresponds to the second network node and, if so, using the access data automatically to establish a new access channel with the second network node and to communicate data thereover.

The access data received in step (b) may include security information such as passwords or encryption keys required to establish new access channels with one or more further network node(s), in which case step (d) comprises automatically transmitting said password, or data encrypted in accordance with the encryption key, over the new access channel to the or each further remote network node.

The method may further comprise determining the geographical location of the communications terminal and transmitting information identifying said location over the first access channel such that, in response, the profile information received in step (b) is dependent on said transmitted location information. The profile information received in step (b) may correspond to one or more further network node(s) located in the vicinity of said geographical location. Additionally or alternatively, the profile information received in step (b) may correspond to one or more further network node(s) for which it is projected that the communications terminal may be in the vicinity at some future time, based on the transmitted location information.

The geographical location of the communications terminal may be determined by one or more of WIMAX triangulation, Wi-Fi triangulation, cellular triangulation, Bluetooth access point triangulation or IP address resolution, although other methods may be employed, for example SSID or MAC address lookup from a central database, or use of the GPS (global positioning system).

According to a second aspect of the invention, there is provided a method of providing access information to a communications terminal which comprises a plurality of network interfaces each capable of establishing a respective access channel with a network by means of connecting to one or more remote network node(s), the method comprising:

(a) establishing a first access channel with the communications terminal;

(b) receiving over the first access channel data enabling the communications terminal to be identified; and (c) returning, based on said identity data, profile information identifying one or more further network node(s) and including access data to allow establishment of a new access channel between a network interface of the communications terminal and the or each further network node(s).

The access data returned in step (c) may include a password and/or encryption key required to establish a new access channel with the, or each, further network node.

The method may further comprise receiving, over the first access channel, data from which can be determined the geographical location of the communications terminal such that, in step (c), the returned profile information is dependent on said location. The determined geographical location may be used to access a database identifying one or more further network node(s) in the vicinity of said geographical location, the returned profile information corresponding to said identified network node(s). Additionally or alternatively, the determined geographical location may be stored for a time frame sufficient to enable the future location of the communications terminal to be estimated, the profile information returned in step (c) corresponding to one or more further network node(s) in an estimated future location.

According to a third aspect of the invention, there is provided a communications apparatus comprising a plurality of network interfaces each capable of establishing a respective access channel with a network by connecting to one or more remote network node(s), the apparatus comprising: a first network interface arranged to establish a first access channel with a first network node and to receive, over the first access channel from a predetermined network address, profile information identifying one or more further network node(s) and including access data to allow establishment of a new access channel between a network interface of the communications terminal and the or each further network node(s); memory for storing said received profile information; means arranged to detect the presence of a second network node connected to, or in range of, the communications terminal and, in response to said detection, to identify whether profile information received in step (b) corresponds to the second network node and, if so, automatically to establish a new access channel with the second network node and to communicate data thereover using either the first network interface or a different network interface.

According to a fourth aspect of the invention, there is provided apparatus for providing access information to a communications terminal which comprises a plurality of network interfaces each capable of establishing a respective access channel with a network by connecting to one or more remote network node(s), the apparatus comprising: an interface arranged to establish a first access channel with the communications terminal; a data receiver arranged to receive, over the first access channel, data enabling the communications terminal to be identified; and a data transmitter arranged to return, based on said identity data, profile information identifying one or more further network node(s), the profile data including access data to allow establishment of a new access channel between a network interface of the communications terminal and the or each further network node(s).

The specific description also discloses a method of communicating data between a communications terminal and a network, the terminal comprising a plurality of network interfaces each capable of establishing an access channel to the network by means of connecting to a network node, the method comprising: (a) establishing a plurality of separate access channels between at least one network interface and at least one network node; (b) receiving operating parameters in respect of each established access channel; (c) receiving a request from an application level program running on the terminal to transfer data to or from the network; and (d) in response to step (c), transferring data between the terminal and the network using a selected one of the established access channels, wherein selection is made in accordance with predefined selection rules indicating which access channel is to be selected in dependence on the operating parameters received in step (b).

In this way, a plurality of access channels are established between the terminal and the network, selection of a channel over which to send and/or received data being based on operating parameters received in respect of each channel. As will be evident from the specific description, the selection rules can be set in such a way as to ensure efficient data transfer.

The term "network interface" is intended to mean any component of the communications terminal that is capable of establishing a data channel with a network, and thereafter communicating data over that channel once it is established. In practice, this might be a component having a MAC (Media Access Control) address such as a Bluetooth or IEEE 802.11 network card, although this is by no means exhaustive. The interface may make use of a wireless carrier medium such as "Bluetooth" or IrDA (infra-red) wireless. A network node is intended to mean a node forming part of, or providing access to, a network and which is capable of communicating with one or more communications terminals. WiFi or WiMax access points are such examples since they provide access to a network, the Internet, via an ISP. It follows that an access channel is the data channel established between a particular network interface and network node.

The plurality of channels can be established between a single network interface and multiple network nodes, between multiple network interfaces and multiple network nodes, or between multiple network interfaces and a single network node.

The method may further comprise (e) receiving updated operating parameters from at least one of said access channels and, in response thereto, (f) automatically switching data transfer between the application-level program and the network to a different one of the established access channels.

The predefined selection rules may indicate a condition associated with at least one of the operating parameters, the selected channel being that whose corresponding operating parameter(s) meet said condition. One of the operating parameters may be the available bandwidth of the channel and the predefined selection rules indicate a minimum bandwidth, the selected access channel having available bandwidth above said minimum bandwidth.

The predefined selection rules may indicate a plurality of operating parameters and, associated with each, a condition, selection being performed by testing the operating parameters of the established access channels against the conditions and identifying an access channel that meets the most conditions. The operating parameters can be tested in a predetermined order and access channels not meeting a particular condition are disregarded for subsequent tests.

The predefined selection rules may indicate which access channel is to be selected in dependence on both the channel operating parameters received in step (b) and the data format of data to be transferred from the application-level program.

Step (a) may comprise detecting a plurality of network nodes to which respective ones of the terminal's network interfaces can connect and automatically transmitting authentication data associated with each detected network node from said network interfaces. The method may further comprise detecting a plurality of network nodes by means of receiving respective identification signals therefrom, accessing authentication data stored at the terminal in respect of each identified wireless network node, and, automatically transmitting each set of authentication data to the network node to which it corresponds. The network interfaces may be wireless receivers and the identification signals are received over a wireless broadcast link. The method may further comprise, receiving, from a predetermined network address, authentication data in respect of one or more network nodes to which at least one of the terminal's network interfaces can connect.

The specific description also discloses a method of interfacing data between an application program running on a communications terminal and a communications network, the method comprising: establishing a plurality of connections between network interfaces of the terminal and the network and, for each established connection, generating operating parameters at least indicative of the data transfer performance over the particular connection, said operating parameters being used to determine which established connection is used to transfer data between the application program and the network.

The communications terminal can be a wireless communications terminal comprising a plurality of wireless network interfaces and wherein connections are established by the terminal identifying identification beacons transmitted by wireless access points and automatically transmitting authentication data to the access points.

The specific description also discloses a method of establishing a data channel between a processing terminal and a communications network, the method comprising: (a) establishing a first network connection between a first network interface of the terminal and a first network node; (b) receiving access data in respect of a second network node by means of the first network connection; (c) detecting the presence of the second network node to which the first or a further network interface of the terminal can connect; and, (d) in response to said detection, automatically establishing a second network connection between the first or further network interface and the second network node using the received access data.

In this way, it is possible to receive access data in respect of one or more network nodes over an existing network connection so that one or more further network connections can be established.

The method can further comprise, between steps (a) and (b), sending identification data from the processing terminal to a predetermined network address thereby to indicate the presence of said processing terminal on the network.

The specific description also discloses a method for providing access data to a processing terminal thereby to enable the terminal to connect to a network, the method comprising: (a) storing a set of access data in respect of one or more network nodes of the network, the or each node providing an access point to the network; (b) detecting the presence of a processing terminal connected to the network by means of a first network node; and (c) sending one or more sets of the stored access data to the processing terminal by means of the first network node.

The above-described method steps may be implemented in a computer program which is executable on a computer processor. There may be provided a communications terminal on which is arranged to run such a computer program, the terminal possibly being a portable computer or PDA.

The specific description also discloses a communications apparatus for transmitting and receiving data over a network, the apparatus comprising: a plurality of network interfaces each being capable of establishing an access channel with a network; a memory for storing one or more executable application-level programs and a set of predefined selection rules; a processor for running the or each application-level program; and control means arranged to establish separate access channels between the network interfaces and network nodes, to receive operating parameters in respect of each network interface, to receive data transfer requests from the or each application level program being run on the processor and to transfer data using a selected one or more of the network interfaces, selection being made in accordance with the stored selection rules which indicate which of the interfaces is to be selected in dependence on received operating parameters.

In the case of wireless network interfaces, each network interface may see several available network access points and can selectively transfer data amongst these as well as between different interface technologies. For example, the apparatus may select between different wireless networks, e.g. operated by different service providers, using the same wireless network interface. This is in addition to selecting between connections established between different network interfaces and respective access points.

Location data can be returned to the apparatus from the network, the location data identifying the location of the network access point. This locating data can be passed up and interpreted at the application layer of the apparatus so that the user is aware of said location.

BRIEF DESCRIPTION OF THE DRAWINGS

An embodiment of the invention will now be described, by way of example, with reference to the accompanying drawings, in which:

FIGS. 4a to 4d shown connection rules that can be applied in a network link selection operation;

DETAILED DESCRIPTION OF PRESENT EXAMPLE EMBODIMENTS

Figure 1:
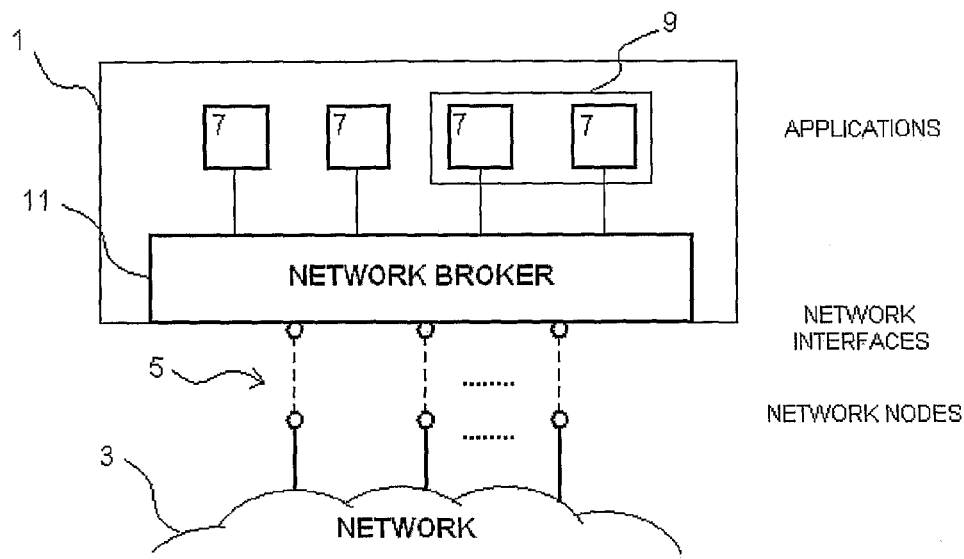
FIG. 1 is a schematic representation of a communications terminal connected to a network.

Referring to FIG. 1, a communications terminal 1 is shown connected to a network 3 by means of a plurality of data channels 5. The terminal 1, which may, for example, be a mobile telephone, personal digital assistant (PDA) or laptop computer, comprises a number of application programs 7 each of which is capable of sending and receiving data over the network 3 via one or more of the data channels 5. For example, a first application may be a Voice over Internet Protocol (VoIP) application providing a voice communications facility between the terminal 1 and one or more other terminals on the network 3. A second application may be an email application, and so on. As indicated in FIG. 1, multiple application programs 7 may be provided in a single client 9 providing a consistent application-level interface to remote network facilities.

The terminal 1 comprises a plurality of different network interfaces. Each network interface is capable of connecting to the network 3 by establishing a respective channel with a network access point or node. Examples of network interfaces include standard ADSL modems as well as wireless interfaces such as infra-red (IrDA), Bluetooth, Wi-Fi and WiMax interfaces. Such interfaces are configured to communicate with access points using a common protocol, i.e. a Wi-Fi interface will communicate with a Wi-Fi access point using the IEEE 802.11 protocol. Access points are often associated with a service provider who makes a monetary charge to users wishing to establish a channel via their access point. In the case of Wi-Fi, for example, the access point may be a publicly-available hotspot located in an airport or coffee shop, or perhaps a home hub connected via a telephone line to the service provider's gateway. Such access points usually require input of at least a password at the user end, i.e. at the network interface, for verification at the service provider end. Further security may be provided by encrypting data transported over the link, for example using the known WEP or WPA encryption standards.

Arranged between the network interfaces and the application layer is a network broker 11. In overview, the purpose of the network broker 11 is to expose available network resources to the applications layer and to select one or more of the network resources to provide data communications between particular applications 7 and the network 3. The selection is preferably automatic in the sense that it is performed in the background without user-intervention. The structure and operation of the network broker 11 will be described in further detail below.

Figure 2:
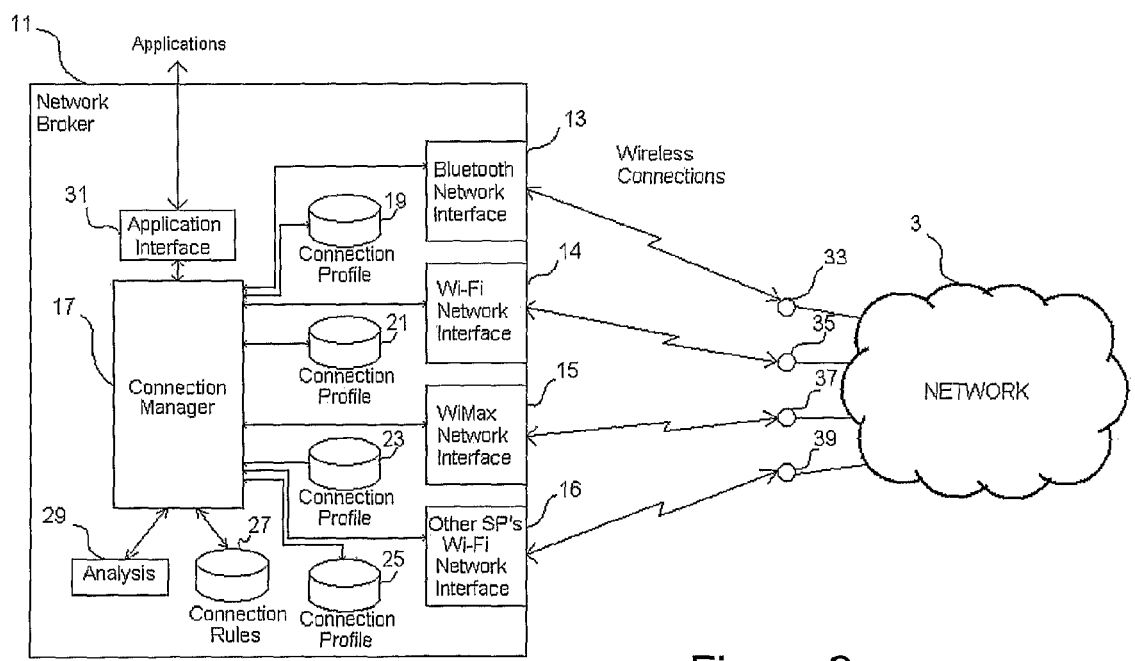
FIG. 2 is a block diagram of a network broker component forming part of the communications terminal.

Referring to FIG. 2, the network broker 11 comprises four network interfaces, namely a Bluetooth interface 13, a Wi-Fi interface 14, a WiMax interface 15 and a further Wi-Fi interface 16. Although the network interfaces are all wireless-type interfaces, this is by no means essential. The first three interfaces 13, 14, 15 are associated with a first service provider, hereafter referred to as 'OurZone', whereas the further Wi-Fi interface 16 is associated with a second service provider, hereafter referred to as 'TheirZone'. Each above-mentioned interface 13-16 is connected to a connection manager 17 which provides a centralised processing function. Also connected to the connection manager 17 are data stores 19, 21, 23, 25 holding respective connection profiles for each of the interfaces, a set of connection rules 27, an analysis function 29 and an application interface 31. The function of each will now be described.

Each of the network interfaces 13-16 is constituted by interface hardware, e.g. a network card and antenna, as well as associated software drivers provided by the manufacturer. The connection profiles 19, 21, 23, 25 for each interface comprise (i) authentication data necessary for the interface to establish a connection with a network (or access) node and (ii) operating parameters representative of the status or performance of a link established using that interface.

The authentication data comprises identity information for at least one network node and a corresponding password to enable connection to that node. In the case of the connection profiles corresponding to the first, second and third network interfaces 13-15, the authentication data includes the identity or identities of Bluetooth, Wi-Fi and WiMax network nodes operated by the first service provider, namely OurZone, as well as one or more passwords for submission to said network nodes as and when they are identified. The node identities may be, for example, the Service Set Identifier (SSID) of a Wi-Fi access point. As will be understood, the SSID is periodically transmitted by Wi-Fi access points in a beacon signal. The connection profile will therefore store, against this SSID, a password enabling connection to one or more access points having this SSID. Similarly, in the case of the connection profile 25 corresponding to the fourth network interface 16, the authentication data includes the identity or identities of network nodes operated by the second service provider, namely TheirZone, and one or more passwords for submission to said network nodes as and when they are identified.

In addition to storing passwords, the authentication data may also comprise keys to enable encryption/decryption of data transmitted over the link, for example WEP or WPA keys.

The way in which authentication data is sent to network nodes, as well as how the data is initially acquired and thereafter updated, will be discussed further on in the description.

As well as authentication data, the connection profile 19, 21, 23, 25 for an interface 13-16 maintains and updates operating parameters representing the status or performance of a link established with said interface. In this embodiment, the operating parameters include one or more of (a) the available bandwidth of the link, (b) the cost of transporting data over the link, (c) the delay or latency of data transport over the link and (d) the quality of service (QoS) exhibited by the link. Other operating parameters may be envisaged, such as whether or not the link is a 'home' link, namely a link to a network node operated by a nominated home service provider such as 'OurZone'.

Certain operating parameters are directly obtainable from the link, such as the available bandwidth. Other operating parameters, such as the delay/latency and QoS, are generated in response to interrogation by the analysis processor of the network broker. The cost parameter can be input by the user or provided automatically from a remote database specifying different tariffs or costs for the different types of link.

The operating parameters are regularly updated so that each connection profile 19, 21, 23, 25 provides up-to-date operating parameters representative of the current status and/or performance of the corresponding link. Obviously, the more frequent the update requests, the closer the operating parameters will be to the actual operating state and/or performance of the link. As will become apparent, the operating parameters are used by the connection manager in selecting one or more links over which the applications communicate with the network 3.

Figure 3:
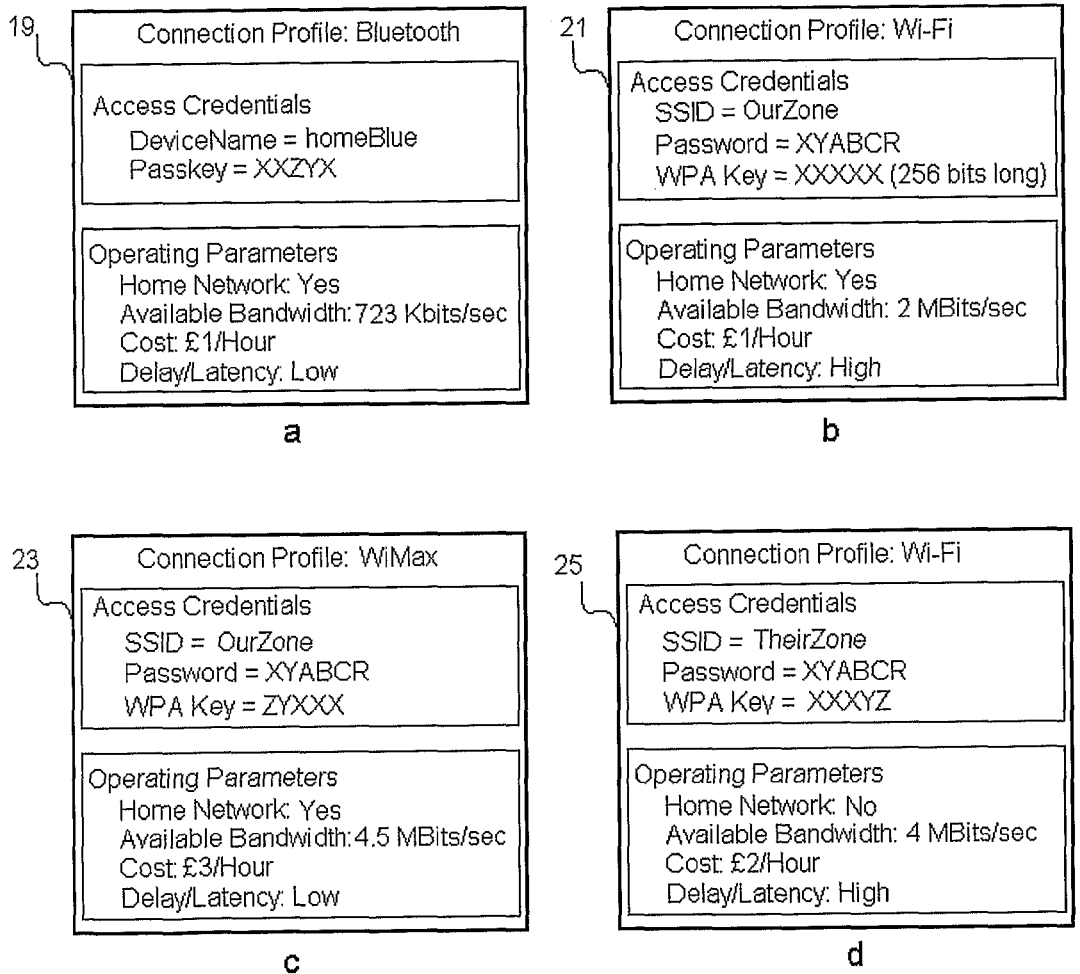
FIGS. 3a to 3d show connection profiles associated with respective network interfaces.

Referring to FIG. 3, exemplary connection profiles 19, 21, 23, 25 are shown for each of the first to fourth network interfaces 13-16. FIG. 3a shows a first data profile 19 stored in respect of the first network interface, namely the Bluetooth interface. The first part of the profile comprises authentication credentials corresponding to a Bluetooth network node which may, for example, be one that connects to the user's home ADSL modem. The authentication credentials include the identity of the Bluetooth network node, here 'homeBlue', together with a password enabling access to homeBlue. A second part of the profile comprises a set of operating parameters associated with the homeBlue link. The accuracy of the operating parameters depends on whether or not the homeBlue link is established. If it is, then the operating parameters will be regularly updated to reflect the up-to-date state of the link. If not, then the operating parameters will be the most recently stored set prior to disconnection. This at last gives an indication of the link's status and capabilities.

FIGS. 3b to 3d show second to fourth connection profiles 21, 23, 25 stored in respect of the second to fourth network interfaces 14-16. In the authentication credentials part of the profiles, the Wi-Fi or WiMax network nodes 14, 15, 16 to which each interface may connect are identified by means of their respective SSID, together with a password for establishing the link. WPA keys are also stored so as to enable encryption and decryption of data transferred over the link. As before, the second part of the profile comprises operating parameters associated with the links.

The connection rules 27 define a predefined set of conditions which the connection manager follows in order to select one or more of the available data links over which an application 7 will communicate with the network 3. In practice, of course, it is the network interface 13-16 providing the available data link that is selected rather than the data link itself. As will be explained below, the connection rules 27 are dependent on at (east one of the operating parameters held in the connection profiles 19, 21, 23, 25 and may also be dependent on the application 7 transmitting and/or receiving the data. The connection rules 27 are preferably user-defined and can be set using a suitable application-level interface.

At the simplest level, the connection rules 27 specify a condition against one of the operating parameters, that condition being applied by the connection manager 17 in relation to all data transfer requests. For example, the rules 27 may specify that the connection manager 17 should select the interface whose link has the highest available bandwidth. In applying this rule, the connection manager 17 will thereafter monitor the 'available bandwidth' operating parameter in each of the connection profiles for connected interfaces to determine which one currently meets the requirement. FIG. 4a shows an interface through which a user can set such a connection rule. Examples of other conditions that may be applied are shown, such as the connection manager always selecting the interface whose link has the lowest cost, lowest delay/latency or highest QoS.

Alternatively, the connection rules 27 may simply specify a predefined priority specifying the order in which interfaces 13-16 should be used depending on whether or not they are connected to the network 3.

Applying such simple connection rules has disadvantages in that the user does not necessarily end up with the most efficient or appropriate link over which to send data. For example, an application 7 that is required to send a number of large video files to a destination computer may well require a link with an available bandwidth of at least 2 Mbits/sec. Selecting the interface 13-16 having the highest available bandwidth may well facilitate this but the associated costs for using the link may be inappropriately high. It would be more cost effective to use an interface 13-16 having a lower bandwidth (but still above the 2 Mbit/sec requirement) with a lower associated cost. To enable this, more complex connection rules can be specified to whittle down the list of available interfaces to one that meets the greatest number of preferred requirements. For example, the connection rules 27 may specify the preferences (a) home network, (b) available bandwidth at least 2 Mbit/sec, (c) cost no greater than £1/Hour and (d) a low delay/latency. The preferences may also specify a range of values, for example an available bandwidth of between 2 and 4 Mbit/sec. FIG. 4b shows a grid relating the preferences to the first to fourth network interfaces. It is assumed that the first, Bluetooth, interface 13 is not connected and that the operating parameters associated with the second to fourth interfaces 14, 15, 16 have the values shown in FIGS. 3b to 3d. It is seen that the connection made using the second and third interfaces 14, 15 conform to the greatest number of requirements. To deal with this situation, a priority may be assigned to one or more of the preferences. For example, giving preference (c) i.e. 'cost no greater than £1/Hour' the highest priority will cause selection of the interface having the lowest associated cost which in this case is the Wi-Fi interface 14.

The above-described connection rules 27 can be commonly applied to all applications 7. In an alternative arrangement, each application 7 is assigned its own connection rules 27. In this respect, it will be appreciated that the type or format of data being transmitted and received by a particular application 7 will require the link over which it is transferred to have certain properties. A VoIP application, for example, will transfer voice data for near-real-time reception at a destination terminal and so requires a network link with minimal delay/latency at relatively low cost. This prioritisation may be at the expense of other parameters such as bandwidth. A different application for sending and receiving video files over the network will obviously have different requirements in that bandwidth is likely to be more critical than the delay/latency of the link. To facilitate this, individual applications 7 can be registered with the network broker's connection manager 17, this registration involving prompting the user to specify the particular connection rules to be applied for data being sent from, or received by, that application. FIGS. 4c and 4d show application interfaces by means of which a user can specify an application 7 and connection rules 27 for association with that application. The first application interface, shown in FIG. 4c, is used to specify simple connection rules whereas the second application interface, shown in FIG. 4d, is used to specify more complex connection rules.

The connection rules 27 can further specify how the connection manager 17 handles data requests from applications 7 where none of the connected interfaces 13-16 meet the requirements of the application. This may occur when an application 7 attempts to send a file or stream of data of a particular size. If the operating parameters of connected interfaces indicate that insufficient bandwidth is available through a single interface, the connection rules 27 specify that a plurality of interfaces be used in combination to provide the required bandwidth. The rules 27 also specify how the different interfaces 13-16 are combined, e.g. in a particular order until the required bandwidth is exceeded or in terms of the least costly combination. If no combination of interfaces 13-16 meets the application's requirements, the connection rules 27 specify that the data transfer is to be buffered at the network broker 11 until such time as the requirements can be met, for example when enough connections have been established to provide the required bandwidth. At this time, the data can be transferred automatically, or in response to user confirmation via an interface at the application layer.

As mentioned above, the connection manager 17 provides the processing functionality of the network broker 11 by means of receiving data transfer requests from applications 7, via the application interface 31, and selecting the network interface 13-16 over which to send data according to the operating parameters and connection rules 27. The connection manager 17 also provides broker information to the applications layer so that the user can view all currently-available connections, i.e. a list of the interfaces by means of which links to the network 3 have been established, as well as the operating parameters associated with each. In this way, the user is able to see the status of each link and/or how each is performing. It follows that the application interface 31 is arranged to transfer said application data requests and broker information to the applications layer.

The operation of the network broker 11 will now be described with reference to FIGS. 5 to 9.

Initially, the network broker 11 will be provided with at least one connection profile 19, 21, 23, 25 to enable connection to at least one network interface 13-16. In this respect, the ability to connect via a single link is all that is initially required since this enables additional profiles to be downloaded at a later time. Preferably, the additional profiles are downloaded automatically from a predetermined network address. The network address may correspond to a server operated by the user's service provider with additional profiles being downloaded, either in response to specific requests or automatically when the service provider's server detects the user's presence on the network 3. The service provider may provide a profile comprising authentication credentials enabling connection via a different service provider's access points. The authentication credentials may comprise a password and/or WEP/WPA encryption keys. In this way, different service providers may act in partnership to allow each other's customers to share respective network resources, therefore increasing coverage across geographical areas. The fact that the authentication credentials relate to a non-home network is likely to be reflected in the cost of using that network 3. The connection profile for 'TheirZone' shown in FIG. 3*d* represents such a non-home network.

It is assumed that the connection manager 17 attempts to form connections as soon as the network broker 11 is enabled, i.e. when the terminal 1 is switched on or a general operating system password verified. This involves periodically monitoring, or listening, for service nodes 33, 35, 37, 39 within range of the terminal 1 and automatically connecting to the nodes if the required authentication credentials are present or can be downloaded from an existing network connection. If the broker 11 operates within a mobile terminal, as is envisaged in this embodiment, connections will be established and dropped as the terminal moves through a geographical area.

Figure 5:
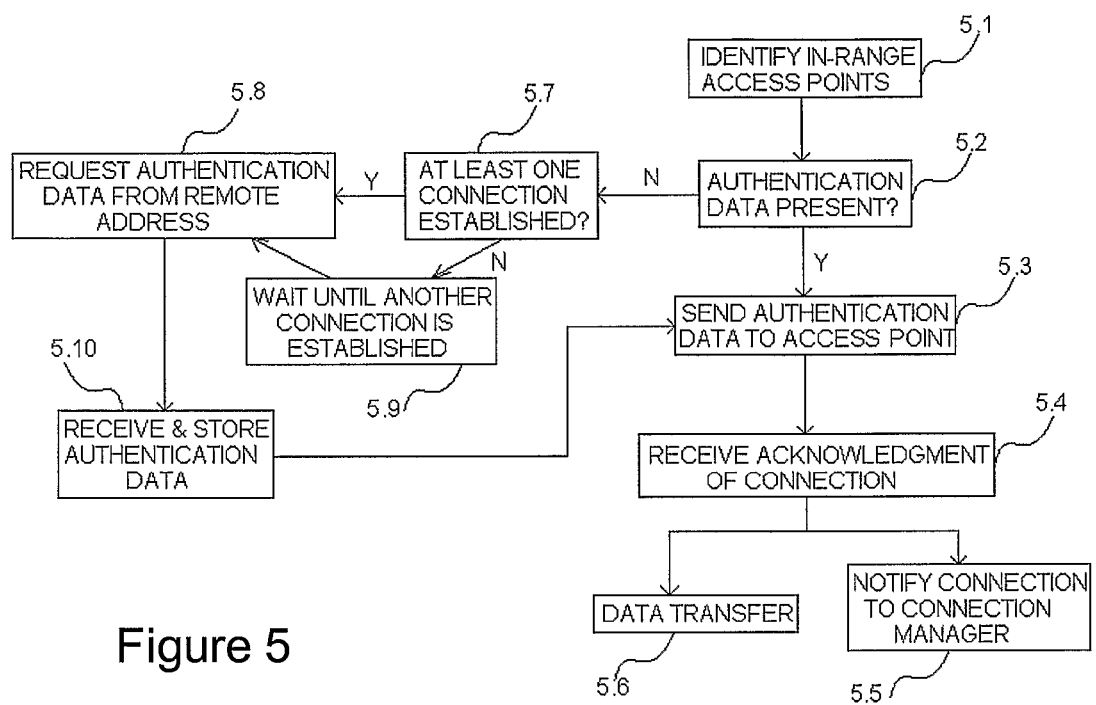
FIG. 5 is a flow diagram showing steps in a method of automatically establishing one or more connections between the network broker and a network.

FIG. 5 is a flow chart showing the main steps involved in establishing network connections. In a first step 5.1, each of the four network interfaces 13-16 listens for identifier beacons transmitted by in-range access points 33, 35, 37, 39. Upon identifying an access point, e.g. by receiving its SSID through the Wi-Fi interface, the connection manager 17 accesses the connection profile of the interface to check whether authentication credentials for that SSID are present (step 5.2). If so, in step 5.3, the authentication credentials are automatically transmitted to the access point from the interface and, assuming the credentials are verified, acknowledgment of connection is received back from the access point (step 5.4), the connection manager 17 is notified of the connection (step 5.5) and data transfer takes place (step 5.6). At this time, updated operating parameters for the network link can be acquired and updated in the connection profile for the interface. Acknowledgment of connection and the updated operating parameters are provided to the application layer through the application interface.

If no authentication credentials are present in the relevant connection profile at step 5.2, the network broker 11 attempts to acquire credentials from a network address, usually a secure server operated by the user's service provider. In step 5.7 it is determined whether a connection currently exists. If no network connection currently exists, e.g. because the terminal 1 is not within range of any access points, then the connection manager 17 halts the process and waits until a connection is available (step 5.9). If a connection exists, or when one is eventually established, authentication data for the identified SSID is requested from the secure server (step 5.8). If available from the secure server and the user agrees to any terms and conditions associated with its download, e.g. to have a charge made to their account, the updated authentication data is downloaded over the existing link to the connection manager which stores the data in the relevant connection profile (5.10). The process of connecting to the identified access point then continues as before.

As mentioned above, authentication data can be downloaded automatically when the user's service provider detects the user's presence on the network 3. This automatic download operation is also used to provide updated credentials as and when they are changed by service providers. In this respect, it will be appreciated that passwords and WEP/WPA encryption keys will be regularly changed by service providers in order to maintain security and prevent unauthorised access by hackers. Preferably, the part of the connection profile 19, 21, 23, 25 that stores the authentication credentials is a secure memory location which is inaccessible to users. A user's presence on the network 3 can be detected by them entering a password into the service provider's network portal.

Figure 6:
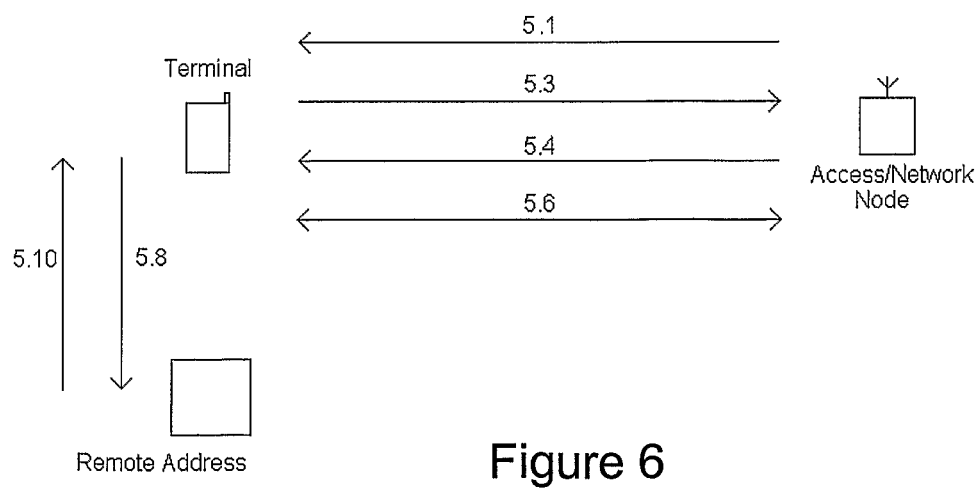
FIG. 6 is a schematic diagram showing data flow between hardware components in accordance with the steps indicated in FIG. 5.

FIG. 6 indicates in schematic form the above-described process of establishing network connections and acquiring authentication credentials.

At the remote server end, i.e. the end that stores authentication credentials for transmission to the mobile terminal, a decision can be made as to the credentials to send for which access point or points based on the current or estimated future geographical location of the mobile terminal. The mobile terminal, when connected to the remote server, is arranged to transmit information enabling its current geographical location to be determined. If the mobile terminal comprises a Global Positioning System (GPS) receiver then this information is simply provided over the existing link. Alternatively, or additionally, the terminal's position can be determined using Wi-Fi or cellular triangulation based on the signal strengths at the terminal's receiver received from different access points of known position. Alternatively, or additionally, the IP address associated with the terminal can be used to resolve its approximate position. The actual geographical location can be determined at the mobile terminal for transmission to the server, or, as in this embodiment, the server itself is responsible to determining the location from the information received from the terminal.

Using this location information, the server is arranged to identify all access points in the vicinity of the mobile terminal, for example within a five mile radius, and to transmit access credentials corresponding to some or all of these access points via the existing channel. The geographical location data may be refreshed periodically, e.g. every five minutes, to account for the mobile terminal changing location, e.g. if the user is on a train.

As an additional feature, the location information is stored over a sufficient time frame to enable a future position of the mobile terminal to be estimated. On this basis, the server can identify access points which the mobile terminal may require access to at a future time and so transfer access credentials corresponding to some or all of these access points via the existing channel. As an example, refreshed positional information may indicate the mobile terminal to be moving towards a particular city or town, or even through a series of cities and towns, which may well be the case if the terminal is being operated on a train. By estimating future positions and the path the terminal is following, it is possible to pre-emptively provide access information so that the user has as many communications options open to him as possible when he passes from one city/town to another.

Historical location information can also be saved over a longer period to identify patterns in the operator's behaviour. So, if, as will often be the case, a user travels to and from work at around the same time and using the same route, location information can be used to identify such a pattern and ensure that all necessary access information is made available to the mobile terminal.

Figure 7:
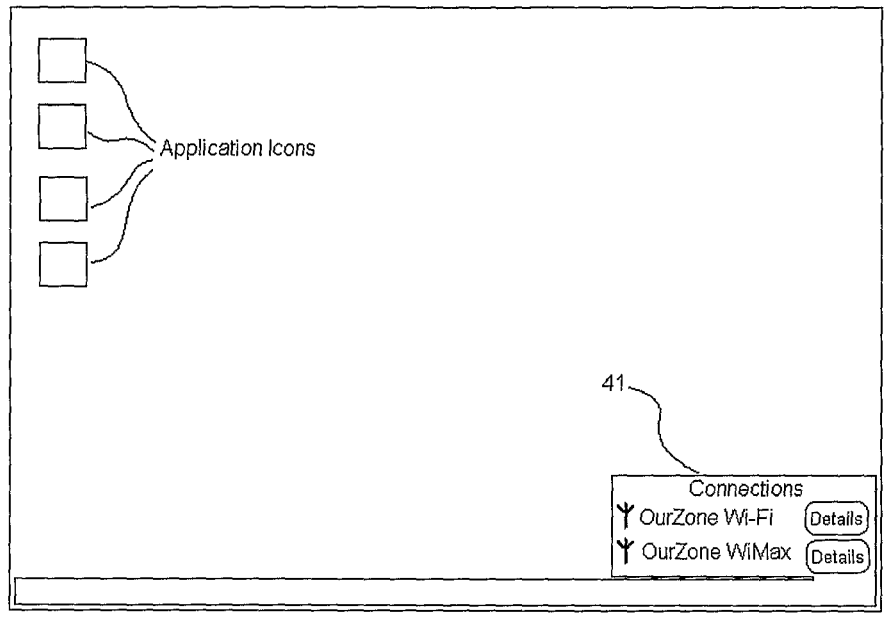
FIG. 7 shows an operating system interface which includes a graphical panel for indicating current network connections.

FIG. 7 shows how network connections and their associated operating parameters can be indicated to a user of the terminal at the application layer. The information is shown in a sub-window 41 of the operating system interface. The user may select a particular connection by means of positioning the mouse pointer over its representative icon, this selection causing the operating parameters to be displayed. The interface can also show aggregated information such as the total bandwidth available.

As described previously, the connection rules 27 are a predefined set of conditions which the connection manager 17 follows in order to select one or more of the available data links over which an application 7 can communicate with the network 3. These will usually be user-defined using a suitable application level interface, such as those shown in FIGS. 4*a*, 4*c* and 4*d*, although particular applications 7 may 'register' a default set of connection rules 27 when the application is installed on the terminal 1. These connection rules 27 are thereafter applied when data is transmitted to or from that application 7.

Figure 8:
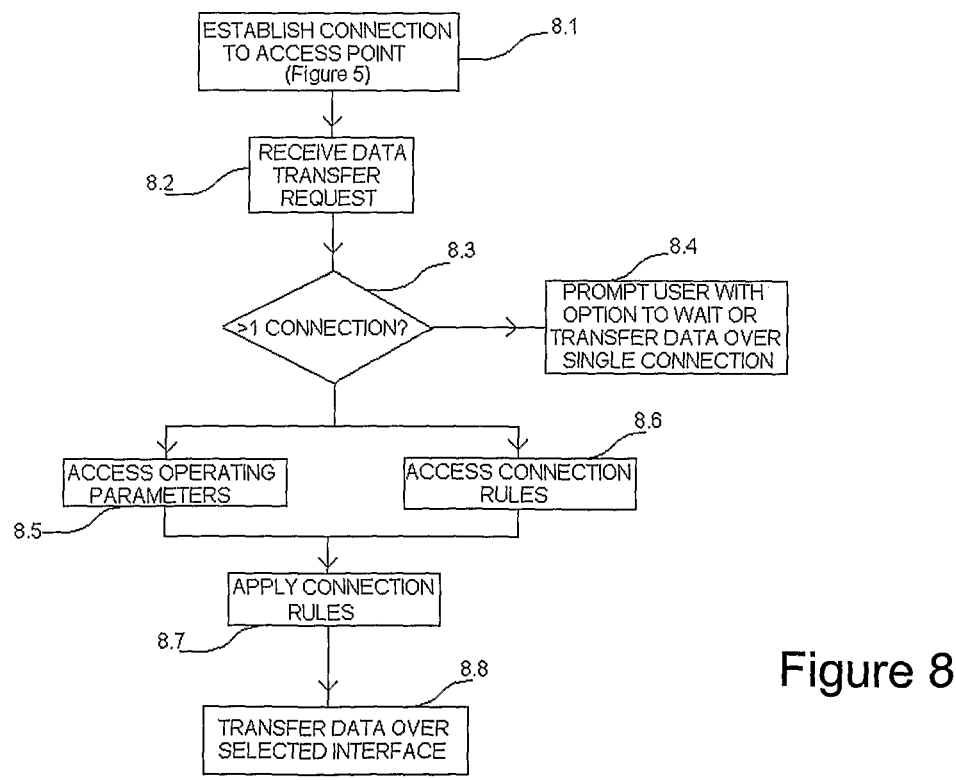
FIG. 8 is a flow diagram showing steps in a method of selecting a network connection over which to transfer data.

FIG. 8 is a flow chart showing the main operating steps performed by the connection manager 17 in selecting one or more network interfaces 13-16 for data transfer between an application 7 and the network 3. In a first step 8.1, one or more connections are established in accordance with the steps shown in FIG. 5. In a second step 8.2, a data request is received from an application 7 via the application interface 31. In a third step 8.3, if only one connection is available then that connection is used to transfer data. In the event that said single connection does not meet a connection rule, it is preferable that the user is first prompted to confirm data transfer using that connection (step 8.4). This helps avoid the situation where data transfers are made automatically over inappropriate connections, e.g. sending a large video file over a narrowband connection at high cost. If more than one connection is available, the connection rules and connection profile operating parameters are retrieved in steps 8.5 and 8.6. Next, the connection rules are applied in step 8.7 to select an interface over which data is subsequently transported in the concluding step 8.8.

A practical example of a terminal 1 operating the above-described network broker 11 will now be described.

Figure 9:
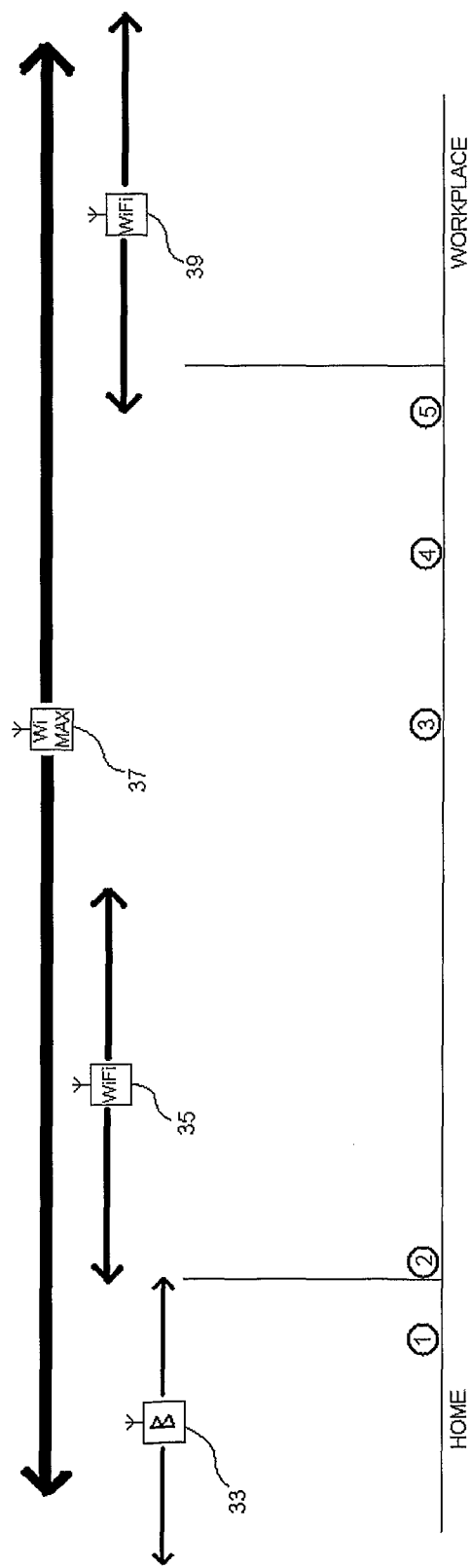
FIG. 9 is a schematic representation, in two-dimensions, of a geographical area including a home and workplace location between which a user operates a communications terminal, the Figure being useful for understanding the invention.

Referring to FIG. 9, there is represented, in two-dimensions, a geographical area in which is positioned, at the left-hand side, a user's home and, at the right-hand side, the user's workplace. The central area between the two locations is the route taken by the user to and from work. Also indicated are four network access points 33, 35, 37, 39 and their respective hotspot ranges. Within the user's home is located a Bluetooth access point 33. In the central area is located a Wi-Fi access point 35 and a WiMAX access point 37. Network access using the aforementioned three access points 33, 35, 37 is provisioned by the user's home service provider, namely 'OurNet'. Within the user's workplace is a further Wi-Fi access point 39 provisioned by a different service provider, namely 'Their-Net'.

The user operates a wireless PDA terminal 1 on which is installed a number of applications 7 capable of communicating data over the network 3. As an example, a first application is a VoIP application by means of which the user can make voice calls over the network 3. A second application is a video camera application by means of which the user can capture high-quality video clips and thereafter send clips over the network 3. Each application 7 has an associated set of connection rules 27, as indicated below, which are registered with the network broker 11.

VoIP Application
Available bandwidth: at least 0.5 Mbit/sec
Delay/latency: low$^P$
Cost: low
Home network only?: no Video Camera Application
Available bandwidth: at least 5 Mbit/sec
Delay/latency: no preference
Cost: choose lowest
Home network only?: yes Within the network broker 11 it is assumed that authentication data for each of the four access points 33, 35, 37, 39 has been acquired (using the steps indicated in FIG. 5) and is stored in the respective connection profiles 19, 21, 23, 25 of the first to fourth network interfaces 13-16. The operating parameters currently stored in each connection profile 19, 21, 23, 25 are assumed to be those shown in FIGS. 3*a* to 3*d*.

Still referring to FIG. 9, the user switches on the PDA 1 at their home location causing the network broker 11 to be enabled. The connection manager 17 automatically causes the network interfaces 13-16 to scan for in-range access points. In position 1, both the Bluetooth and WiMAX access points 33, 37 will be identified and so connections are automatically established using the first and third interfaces 13, 15 and stored authentication credentials in the corresponding connection profiles 19, 23. The new connections are indicated to the user using the interface shown in FIG. 7.

The user then executes the VoIP application and requests a voice call to a destination terminal over the network 3. In response to the voice call request, the connection manager 17 accesses (a) the connection rules 27 for the VoIP application and (b) the operating parameters for each of the connected network interfaces 13, 15, i.e. those shown in FIGS. 3*a* and 3*c*. The operating parameters of the Bluetooth and WiMax interfaces 13, 15 indicate that both meet the bandwidth and latency/delay requirements. Since the cost associated with the Bluetooth interface 13 is lower than that of the WiMAX interface 15, the Bluetooth interface is preferred and so data from the VoIP application is thereafter sent to the network 3 using the Bluetooth interface.

As the user travels to their workplace, the Bluetooth connection is dropped at position 2 and a Wi-Fi connection automatically established as the user enters the Wi-Fi hotspot. The network broker 11 therefore needs to transmit data via a different network link by selecting either the WiMAX or Wi-Fi interface 14, 15. Both interfaces 14, 15 meet the bandwidth requirements. The WiMAX interface 15 meets the delay/latency requirement whereas the Wi-Fi interface 14 meets the cost requirement. According to the connection rules, the delay/latency requirement is given priority (given the real-time nature of VoIP) and so voice data is automatically switched to the WiMAX interface 15. This interface 15 is used for the remainder of the call which is terminated at position 3. During this part of the journey, the Wi-Fi connection is dropped as the user leaves the hot spot.

As the user gets nearer their workplace, the video camera application is executed (position 4) and the user makes a request to transfer a large video file to a network destination. At this point, only the WiMAX interface 15 remains connected. According to the connection rules for the video camera application, the WiMAX interface 15 does not meet the bandwidth requirement and so a message is presented to the user at the application layer. This message enables the user to override the bandwidth requirement and commence transfer over the WiMAX interface 15 or wait until sufficient bandwidth is available. Assuming the latter is chosen, the data is buffered until the user enters the second Wi-Fi hotspot at position 5. In this case, the combined bandwidth of the WiMAX and second Wi-Fi connections meets the bandwidth requirement and so data is sent using both interfaces 15, 16 in parallel.

The above-described network broker 11 provides an interface between application and network resources. Network connections are automatically identified and established as and when they become available with the state and/or performance of said connections being used in conjunction with predefined connection rules 27 to intelligently select connections appropriate to application resources. In practice, this means that processing devices, for example laptops, mobile telephones and PDAs, can maintain some form of network connection in an automatic and seamless way provided they are in range of a network access point. This is particularly useful given the current trend towards mobile working and the fact that service providers are providing greater numbers of publicly-available, high bandwidth access points.

Figure 10:
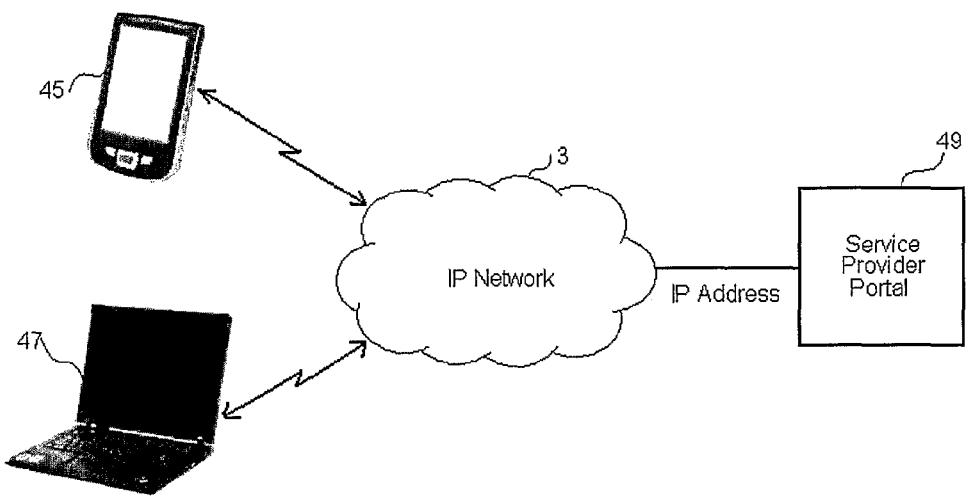
FIG. 10 is a block diagram of a network arrangement comprising two processing terminals and a service provider (SP) portal.
Figure 11:
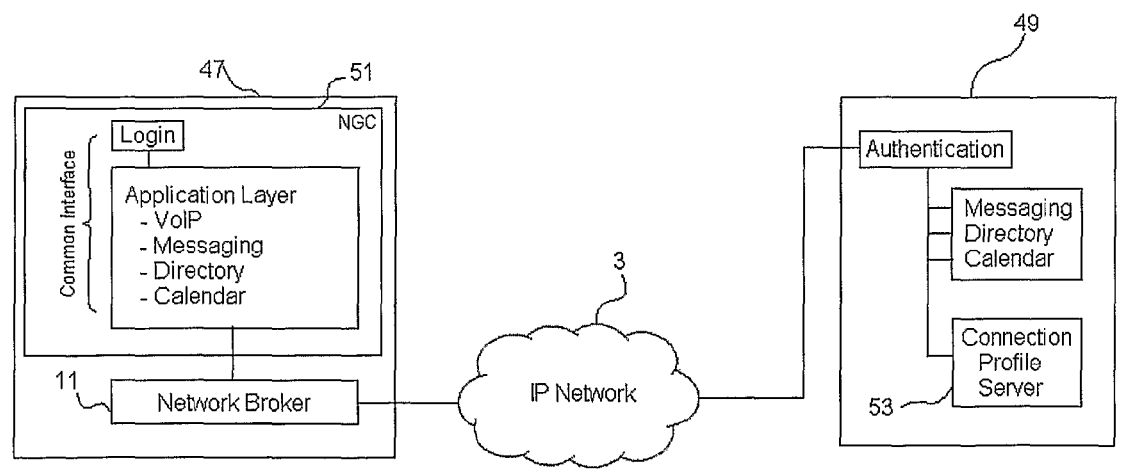
FIG. 11 is a block diagram showing a processing terminal and the SP portal of FIG. 10 is greater detail.

A second embodiment of the invention will now be described with reference to FIGS. 10 and 11. Referring to the figures, a network arrangement comprises first and second processing devices, namely a PDA 45 and laptop 47, connectable to an IP network 3 via respective wireless access links. It is assumed that each of the PDA 45 and laptop 47 operate a so-called next-generation client (NGC) 51 and network broker 11 as described above with reference to FIGS. 1 to 9. A service provider (SP) server 49 is also shown connected to the network 3 and is accessible through a predetermined IP address.

The NGC is an application program providing both client and network-based services. Regarding the latter, the NGC 51 provides an interface by means of which a user can access a common set of services regardless of the particular device they are using. The services are effectively sub-programs running at the application layer and, in this embodiment, include VoIP, messaging, directory and calendar applications. Upon turning on the PDA 45 or laptop 47, the NGC 51 and network broker 11 are enabled. The network broker 11 establishes one or more network links in the manner described above. The user may run a particular service in the usual manner such as by using cursor, touchpad or mouse control to double-click an appropriate icon. In the case of a client-based service, such as the VoIP application, execution results in presentation of a user interface by which the user dials a telephone number. The call is thereafter set up over a selected one of the network connections, assuming one is available, and a voice call session is initiated in the conventional manner, for example using a session initiation protocol (SIP) session. In the case of network-based services, such as the messaging, directory and calendar applications, the NGC 51 connects to a login portal via the predetermined IP address associated with the SP server 49. The login portal prompts input of a user ID and password. Upon transmission of valid login credentials, the NGC 51 presents a home page showing the range of network-based services available to the user. For example, the messaging service enables the sending and receiving of messages to other users as well as retrieval of previously sent and received messages stored in the user's network archive. Similarly, the directory and calendar services present, respectively, a contact list and calendar personalised for the logged-in user.

Also provided at the SP server 49 is a connection profile server 53. The connection profile server 53 stores up-to-date authentication credentials suitable for accessing wireless access points operated by the home service provider, and, optionally, one or more other service providers in partnership with the service provider. Upon detecting the presence of the user on the network 3, i.e. by means of them being logged in to the SP server 49, the connection profile server 53 interrogates the connection profiles 19, 21, 23, 25 in the network broker 11 which has established the connection. If authentication data, such as passwords or WEP/WPA keys are not present, or are out of date, the connection profile server 53 automatically transmits the up-to-date data to the network broker 11. In this way, the network broker 11 is able to make as many connections as is permitted by their subscription relationship with the service provider. If a user does not wish their network broker 11 to connect to non-home access points, e.g. to save costs, they will not receive updates to enable said connections. As indicated previously, authentication credentials may be transmitted based on the current or estimated future location of the terminal.

What is claimed is:

1. A method of operating a communications terminal which comprises a plurality of network interfaces each capable of establishing an access channel with a respective network by a process of connecting to one or more remote network nodes, the method comprising:
   (a) establishing a first access channel between a first network interface of the communications terminal and a first remote network node;
   (b) receiving over the first access channel, from a predetermined network address, profile information identifying one or more further network nodes, the profile information including access data to allow establishment of a further access channel between a network interface of the communications terminal and the or each further network node;
   (c) detecting the presence of a second network node connected to, or in range of, the communications terminal; and
   (d) in response to said detection, identifying whether the profile information received in step (b) corresponds to the second network node and, if so, using the access data automatically to establish a new access channel with the second network node and to communicate data thereover.

2. A method according to claim 1, wherein the access data received in step (b) includes security information required to establish a new access channel with the or each further network node, and in which step (d) comprises automatically transmitting said security information, or data encrypted with said security information, to the second network node.

3. A method according to claim 1, further comprising determining the geographical location of the communications terminal and transmitting information identifying said location over the first access channel such that, in response, the profile information received in step (b) is dependent on said transmitted location information.

4. A method according to claim 3, wherein the profile information received in step (b) corresponds to one or more further network node(s) located in the vicinity of said geographical location.

5. A method according to claim 3, wherein the profile information received in step (b) corresponds to one or more further network node(s) for which it is estimated, from the transmitted location information, that the communications terminal will be in the vicinity of at some future time.

6. A method according to claim 3, wherein the geographical location of the communications terminal is determined by one or more of Wi-Fi triangulation, cellular triangulation or IP address resolution.

7. A non-transitory computer-readable storage medium storing a computer program which , when executed by a processor, performs the steps according to claim 1.

8. A method of communicating data between a communications terminal and a network, the terminal comprising a plurality of network interfaces each capable of establishing an access channel to the network by connecting to a network node, the method comprising:

(a) establishing a plurality of separate access channels between at least one network interface and at least one network node;

(b) receiving over a first of the access channels, from a predetermined network address, operating parameters in respect of each established access channel;

(c) receiving a request from an application level program running on the terminal to transfer data to or from the network; and (d) in response to step (c), transferring data between the terminal and the network using a selected one of the established access channels, wherein selection is made in accordance with predefined selection rules indicating which access channel is to be selected in dependence on the operating parameters received in step (b).

9. A method according to claim 8, wherein the operating parameters received in step (b) includes security information required to establish a new access channel with another network node, and in which step (d) comprises automatically transmitting said security information, or data encrypted with said security information, to the another network node.

10. A method according to claim 8, further comprising determining the geographical location of the communications terminal and transmitting information identifying said location over the first of the access channels such that, in response, the operating parameters received in step (b) is dependent on said transmitted location information.

11. A method of providing access information to a communications terminal which comprises a plurality of network interfaces each capable of establishing a respective access channel with a network by means of connecting to one or more remote network node(s), the method comprising:

(a) establishing a first access channel with the communications terminal;

(b) receiving, over the first access channel, data enabling the communications terminal to be identified; and (c) returning, based on said identity data, profile information identifying one or more further network nodes, and including access data to allow establishment of a new access channel between a network interface of the communications terminal and the or each further network node.

12. A method according to claim 11, wherein the access data returned in step (c) includes a password and/or encryption key required to establish a new access channel with the or each further network node.

13. A method according to claim 11, further comprising receiving, over the first access channel, data from which can be determined the geographical location of the communications terminal such that, in step (c), the returned profile information is dependent on said location.

14. A method according to claim 13, wherein the determined geographical location is used to access a database identifying one or more further network node(s) in the vicinity of said geographical location, the returned profile information corresponding to said identified network node or nodes.

15. A method according to claim 13, wherein the determined geographical location is stored for a time frame sufficient to enable the future location of the communications terminal to be estimated, the profile information returned in step (c) corresponding to one or more further network node(s) in an estimated future location.

16. A method according to claim 15, wherein the geographical location of the communications terminal is determined by one or more of Wi-Fi triangulation, cellular triangulation or IP address resolution.

17. Communications apparatus comprising a plurality of network interfaces each capable of establishing a respective access channel with a network by means of connecting to one or more remote network nodes, the apparatus comprising:

a first network interface arranged to establish a first access channel with a first network node and to receive, over the first access channel and from a predetermined network address, profile information identifying one or more further network nodes, the profile information including access data to allow establishment of a new access channel between a network interface of the communications terminal and the or each further network node(s);

memory for storing said received profile information;

a connection manager arranged to detect the presence of a second network node connected to, or in range of, the communications terminal and, in response to said detection, to identify whether the received profile information corresponds to the second network node and, if so, automatically to establish a new access channel with the second network node and to communicate data over the new access channel using either the first network interface or a different network interface.

18. The communications apparatus of claim 17, wherein the received profile information corresponds to one or more further network node(s) for which it is estimated, from transmitted location information representing geographical location of the communications apparatus, that the communications apparatus will be in the vicinity of the one or more further network node(s) at some future time.

19. Apparatus for providing access information to a communications terminal which comprises a plurality of network interfaces each capable of establishing a respective access channel with a network by connecting to one or more remote network nodes, the apparatus comprising:

an interface arranged to establish a first access channel with the communications terminal;

a data receiver arranged to receive, over the first access channel, data enabling the communications terminal to be identified; and a data transmitter arranged to return, based on said identity data, profile information identifying one or more further network node(s), the profile data including access data to allow establishment of a new access channel between a network interface of the communications terminal and the or each further network nodes.

20. The apparatus of claim 19, wherein the profile information corresponds to one or more further network node(s) for which it is estimated, from received location information representing geographical location of the communications terminal, that the communications terminal will be in the vicinity of the one or more further network node(s) at some future time.

* * * * *

UNITED STATES PATENT AND TRADEMARK OFFICE
CERTIFICATE OF CORRECTION

PATENT NO. : 8,687,547 B2  Page 1 of 1
APPLICATION NO. : 12/863767
DATED : April 1, 2014
INVENTOR(S) : Robert Collingrige It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 574 days.

Signed and Sealed this

Twenty-ninth Day of September, 2015

Michelle K. Lee
*Director of the United States Patent and Trademark Office*